US005699528A

United States Patent [19]

Hogan

[11] Patent Number: 5,699,528
[45] Date of Patent: Dec. 16, 1997

[54] SYSTEM AND METHOD FOR BILL DELIVERY AND PAYMENT OVER A COMMUNICATIONS NETWORK

[75] Inventor: Edward J. Hogan, Bayside, N.Y.

[73] Assignee: MasterCard International, Inc., Purchase, N.Y.

[21] Appl. No.: 550,822

[22] Filed: Oct. 31, 1995

[51] Int. Cl.[6] .................................................. G06F 17/60
[52] U.S. Cl. ............................................................ 395/240
[58] Field of Search ................................ 395/226, 227, 395/239, 240, 242, 244; 380/24, 30

[56] References Cited

U.S. PATENT DOCUMENTS

| | | | |
|---|---|---|---|
| 4,799,156 | 1/1989 | Shavit et al. | |
| 4,823,264 | 4/1989 | Deming | 395/239 |
| 5,220,501 | 6/1993 | Lawlor et al. | |
| 5,265,033 | 11/1993 | Vajk et al. | |
| 5,383,113 | 1/1995 | Kight et al. | 395/240 |
| 5,420,405 | 5/1995 | Chasek | |
| 5,465,206 | 11/1995 | Hilt et al. | |
| 5,473,143 | 12/1995 | Vajk et al. | |
| 5,483,445 | 1/1996 | Pickering | |
| 5,532,920 | 7/1996 | Hartrick et al. | |
| 5,557,518 | 9/1996 | Rosen | 395/244 |
| 5,570,465 | 10/1996 | Tsakanikas | 395/114 |
| 5,590,197 | 12/1996 | Chen et al. | 380/24 |

FOREIGN PATENT DOCUMENTS

| | | |
|---|---|---|
| 9116691 | 10/1989 | WIPO |
| 9308545 | 4/1993 | WIPO |
| 9608783 | 3/1996 | WIPO |

OTHER PUBLICATIONS

"Cards On The Internet . . . Advertising on a $3 Bill," by Gerry VanDenengel, World Card Technology, Feb. 1995, pp. 46–48.

"A Player Goes After Big Bucks in Cyberspace," by K. Epper, American Banker, May 5, 1995.

"A Difference Drummer on the Data Highway," by J. Kutler, American Banker, May 12, 1995.

"Internet Bank Moves Closer to Virtual Reality," by R. Meredith, USA Today, May 5, 1995.

"Dutch Software Concern Experiments With Electronic 'Cash' in Cyberspace," by K. Strassel, Wall Street Journal, Apr. 7, 1995.

"Cash Just Isn't Flexible Enough," by N. Rosen, Daily Express, Feb. 10, 1995.

"Debit Cards Seen Poised For New Market," by B. Piskora, American Banker, Mar. 7, 1995, p. 16.

"Cash, Check, Charge—What's Next?," by D. Bank, Seattle Times, Mar. 6, 1995.

"CyberSpace—Crafting Software that Will Let You Build a Business Out There," by A. Cortese et al., Business Week, Feb. 27, 1995, pp. 46–48.

"NetBill: An Internet Commerce System Optimized for Network Delivered Services," by M. Sirbe et al., Carnegie Mellon Univ., Feb. 27, 1995.

"Cash Card Creator Looking Beyond Mondex," by J. Kutler, American Banker, Feb. 9, 1995, p. 16.

"E–Cash: Can't Live With it, Can't Live Without It," by David Post, The American Lawyer, Mar. 1995, pp. 116–117.

Primary Examiner—Donald E. McElheny, Jr.
Attorney, Agent, or Firm—Brumbaugh, Graves, Donohue & Raymond

[57] ABSTRACT

In a bill delivery and payment system, users are able to access a server computer on a communications network to obtain bill information and pay bills. For example, such a communications network may be the Internet or the World Wide Web thereof. Using a personal computer, a user can access a Web site provided by the server computer to view the bill information and instruct the server computer as to the details of the bill payment. In a second embodiment, without visiting the web site, users are provided with electronic bills containing bill information in the form of electronic mail (e-mail) at their e-mail addresses. After opening an electronic bill, a user can make the bill payment by replying to the electronic bill.

38 Claims, 11 Drawing Sheets

901 —
A. VIEW AND/OR PAY BILLS
B. VIEW PAYMENT CONFIRMATIONS
C. VIEW ADMINISTRATIVE MESSAGES
D. EXIT

107

AS OF 6-1-95

| | PAYEES | BILL AMOUNTS | DUE DATES |
|---|---|---|---|
| 1. | INSUCO | $245.00 | 4-3-95 |
| 2. | Electric Co. | $114.43 | 5-19-95 |
| *3. | MACY'S | $12.50 | 5-20-95 |

1003

DATE:     MON, 12 MAY 1995 00:29:44 EDT

FROM:    [ EBSC < EBSC @ ELECTRONIC. ADD > ] —1101

TO:      [ SUBSCRIBER @ ELECTRONIC. ADD ] —1103

SUBJECT: [ ELECTRIC CO., $114.43, 5-19-95 ] —1105

---

1109

| Your account number | Next reading date | Service to: |
|---|---|---|
| 61-1408-095-0004-2 | JUN 9, 1995 | 1209 8 Avenue |

BILLING SUMMARY AS OF 05/11/95

Amount due last bill_____$104.79
Payments through 05/09_____$104.79
Balance remaining_____  NONE

CURRENT ELEC CHARGES_____$114.43
TOTAL AMOUNT NOW DUE_____$114.43

| ELECTRIC CO. | conserve energy |

---

>DO YOU AUTHORIZE PAYMENT OF THE BILL ?  <Y/N>__

FIG. 11

SYSTEM AND METHOD FOR BILL DELIVERY AND PAYMENT OVER A COMMUNICATIONS NETWORK

TECHNICAL FIELD

This invention relates to a financial transaction system and method, and particularly to a system and method for delivery and payment of bills over a communications network.

BACKGROUND OF THE INVENTION

Each household needs to spend a significant amount of time each month to respond to numerous bills including utility bills, credit card bills, mortgage payments, car loan payments, insurance payments, etc. The most common method of payment of the bills is writing paper checks for the appropriate amounts and mailing such checks to payees. This method is labor intensive and time consuming for a bill-payer, and must be done on multiple occasions each month since the bills do not normally arrive or become due on the same date. In addition, the bill-payer has to absorb the costs of postage in mailing the paper checks to payees. Paper checks processing also entails significant costs to the payees who receive and handle remittances in this manner.

Attempts have been made to improve the efficiency of the bill payment method. One such attempt involves use of telephone systems for handling the bill payment. The advanced telephone bill-paying systems incorporate voice response technology to obviate the need of a human operator's answering the calls. Most of the telephone bill-paying systems are run by individual banks, with which the users have accounts. Guided by phone instructions, a user normally provides the system with information on different bills to be paid, including identities of the payees and the bill amounts.

Nonetheless, telephone bill-paying systems have serious limitations because of a lack of a visual interface or display. Sophisticated service options are impractical because of their reliance on complex branching alternatives requiring depression of a series of keys on the telephone keypad, which may cause confusion and annoyance to the users. In addition, authorization, confirmation and review of payments are bothersome because the users need to enter the identities of the payees by their code numbers, which may not be easily memorizable.

As personal computers (PC's) find their way into people's homes, techniques for bill payment using a personal computer have emerged. One such technique is disclosed in U.S. Pat. No. 5,220,501 issued Jun. 15, 1993 to Lawlor et al. In accordance with this technique, the user utilizes a personal computer to communicate bill payment requests to a central computer operated by a bill-paying service provider. The central computer analyzes and processes the requests which are typically for many payments at a time. The information about these payments including scheduled payment dates is stored in a database in the central computer. On the scheduled payment dates, the central computer generates and communicates electronic funds transfer requests through an automated clearing house (ACH) or automatic teller machine (ATM) network to the bank with which the user has an account, thereby debiting the user's account for the payments. The central computer then distributes the funds received to the appropriate payees.

Thus, some of the major shortcomings of the prior-art bill paying techniques are that a user is required to inconveniently go through multiple steps to have their bills paid (including manually receiving each bill, reviewing and storing it), and that the techniques rely on the user to provide the bill information to initiate the bill-paying process. In the event that the user misplaces a bill, or is away from home on a business trip or vacation, without receiving bills in the mail, the bills will be unpaid and may become overdue. Overdue bills may incur finance charges and/or cause other inconveniences, e.g., the trouble of getting cancelled or terminated services reinstated. The inflexibility of bill payment imposed by the prior art techniques is attributable to their failure to take full advantage of advanced PC and communications technologies.

Accordingly, it is desirable to have a system and method whereby a user may conveniently and reliably receive the bills from any location and, at the same time, efficiently make the bill payment by taking full advantage of the advanced technologies.

SUMMARY OF THE INVENTION

In a bill delivery and payment system in accordance with the invention, the payees no longer mail the bills to the system users, but securely deliver the bill information over a communications network, such as the well-known Internet network, telephone network, or private network, which the users may conveniently access. To that end, a "bill capture" device is employed to collect from the payees the bill information concerning the users, which includes the amounts of individual bills, the payment due dates, etc. In a preferred embodiment, the collected information is provided to a server computer connected to the communications network. The bill information may be accessed by users using "browser" software in the case of the Internet (or in particular the World Wide Web (WWW)), or by direct access in the case of a telephone network or private network. In the event that the bill information is not accessed after it is available for a predetermined period of time, the server computer will send a message in the form of an e-mail communication to a user that his/her bills are awaiting payment.

Upon accessing the server computer over the communications network, the users may respond by authorizing payments to selected payees. The payments are preferably made directly from the users payment accounts including credit and checking accounts. The user's response contains payment data including the payment type (e.g., credit or checking), payment amount, desired payment date, etc.

In an alternative embodiment, the server computer formats the bill information in the form of e-mail messages and deliver them to the e-mail addresses of the responsible users. The users may go on-line to retrieve the "electronic bills" addressed to them, and respond by sending to the server computer e-mail messages containing the payment data.

In either embodiment, after receiving the payment data from a user, the server computer takes action to ensure settlement of funds between the user's account and the appropriate payees. The server computer also electronically routes the payment information to the payee to update its records.

Advantageously, with this invention, a user is able to electronically receive, review and pay the bills through a series of brief on-line sessions each month.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 5 is a block diagram including the server computer, a subscriber bank computer and an acquirer computer, and their interconnection in accordance with the invention;

FIG. 11 is a display showing an electronic bill in the second embodiment of the system of FIGS. 1 and 5;

Figure 1:
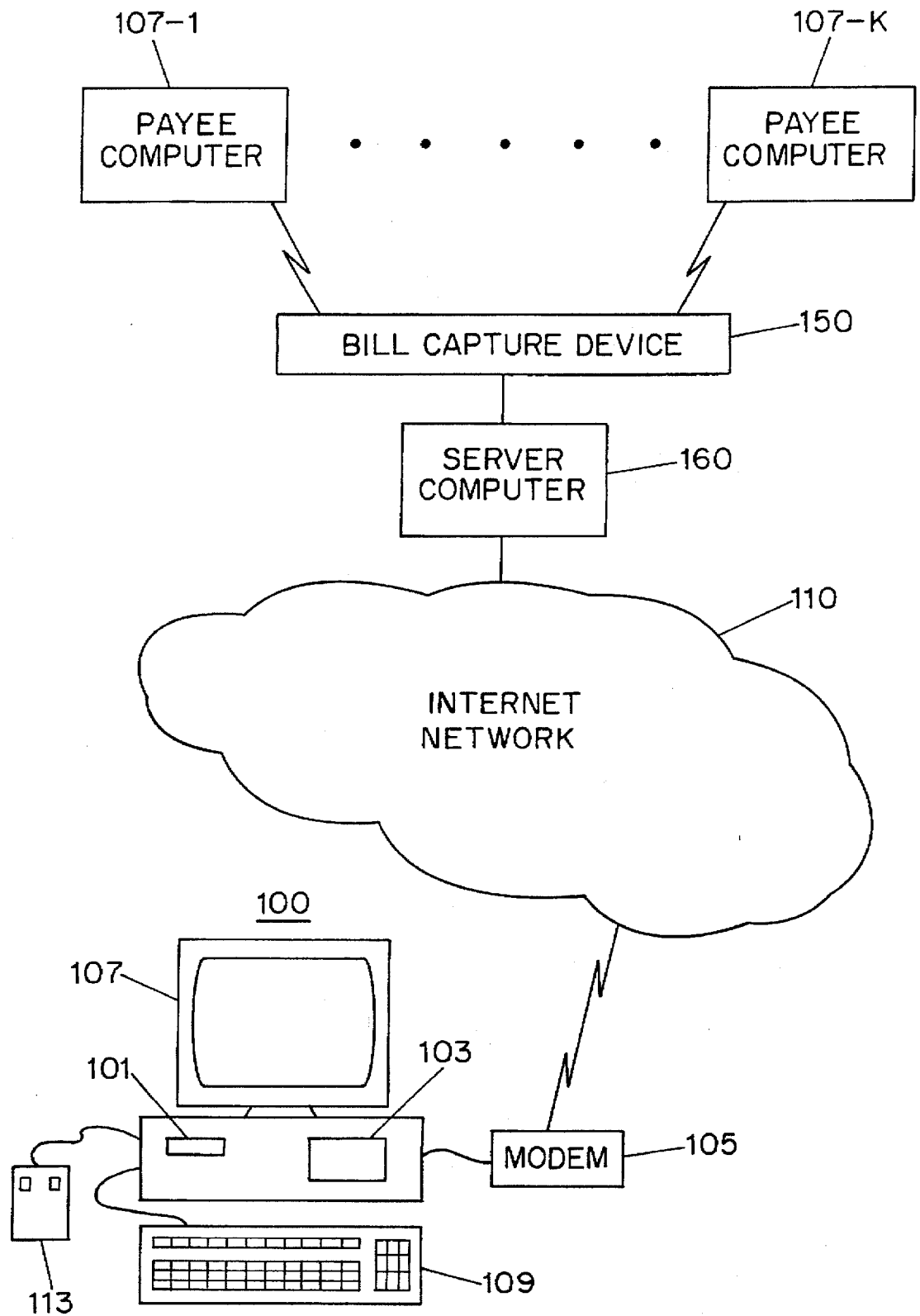
FIGS. 1 and 5 combinedly illustrate a system wherein bills are electronically presented and paid over a communications network in accordance with the invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION

The present invention is directed to a technique for delivery of bills over a communications network, and payment of the bills through the network using a personal computer (PC).

Over the past decade, PC's have become relatively powerful and inexpensive, and have found their way into a significant number of people's homes. With a modem, a PC user can communicate with other computers through communications networks, and access many resources on the so-called "Information Superhighway." Companies such as America Online, CompuServe, and Prodigy which traditionally provided so-called "content" over proprietary networks have begun to provide access by a PC user to an expansive international network of networks known as the Internet. The Internet comprises a series of some 50,000 computer communications networks around the world, and provides connectivity between more than 38 million computer users, which number is predicted to grow to 100 million by 1998. The on-line services typically provide, on the "net," functionality such as electronic mail (e-mail), file transfer protocol (ftp), and World Wide Web (WWW) access.

WWW is a graphical subnetwork of the Internet. With common "web browser" software of the type of Mosaic or Netscape Navigator, the users may easily access Internet information and services on WWW. The web browser handles the function of locating and targeting information on the Internet and displaying information provided by a web server. WWW utilizes the technology called "hypertext" to organize, search and present information on the Internet. Using the browser, a user can select a word ("hypertext word") from a viewed document, and be linked to another document featuring information related to the word. These links are within the Web server domain and result in a progressively deeper search or base of choices.

In the business arena, a service provider can, with an Internet address and a hypertext editor, develop a hypertext document called a "home page", which a user may explore when he/she visits the provider's Web server. This home page furnishes information about the service offered by the provider through use of graphic images, sound, hyperlink choices, etc. With that information, the user is guided through the home page to select the service and desired service features.

In FIG. 1, PC 100 is illustratively employed by a subscriber of the electronic bill payment service in accordance with the invention, to access Internet network 110 via a dial-up link. PC 100 is a conventional personal computer and contains, inter alia, microprocessor 101; memory 103 for storing data, and programs comprising standard on-line service software package including browser software for accessing information and services on WWW; modem 105 for establishing the dial-up link to a gateway computer (not shown) connected to the network; display 107; keyboard 109 and mouse 113. The gateway computer is maintained and controlled by an on-line service provider, e.g., America Online, CompuServe, Prodigy and such, to facilitate the on-line access to network 110.

Also connected to network 110 is server computer 160 controlled and maintained by an electronic bill service company (EBSC), which defines the features and requirements of the electronic bill payment service in accordance with the invention, and oversees the service. Among other things, computer 160 comprises communications capabilities which include affording WWW access and sending messages in an e-mail format to the service subscribers over network 110.

Traditionally, insurance companies, financial institutions such as banks, and utility companies such as telephone, electric and gas companies bill their customers for payments of insurance premiums, loans, utility services, etc. The billing is accomplished by mailing to the customers itemized bills. After receiving the bills in the mail, the customers pay the respective payees, most often by paper checks through the mail.

In accordance with the invention, EBSC has negotiated with selected payees participating in the electronic bill payment service such that the payees no longer mail the bills to the subscribers of the service, but provide the billing data concerning the subscribers to bill capture device 150 which may be a conventional computer. In practice, this bill capture device could be made part of server computer 160. Payee computers 170-1 through -K communicate with device 150 pursuant to an agreed-upon protocol (where K is the number of participating payees), and periodically download the billing data to the device through transmission links or magnetic tapes. Device 150 collects and processes bill images from the participating payees after the images are created, but before they are printed, to extract the billing data.

The billing data is transmitted from device 150 to server computer 160, via which the subscribers are able to access and "browse" their bills on WWW, and pay the bills using one or more accounts such as credit, checking, and NOW accounts, home equity lines of credit, and any other accounts from which funds may be drawn. The billing data is stored in such a form that the subscribers are allowed to view full graphics of their bills on PC's, print the bills on printers connected thereto, and download them for storage. Payment transactions are routed from server computer 160 to another network or system such as MasterCard's Banknet, MasterCard Debit Switch system or the automated clearing house (ACH) for credit and/or debit authorization. Clearing and settlement of the transactions with the appropriate payees are then performed in a conventional manner.

Thus, with the web browser software installed on PC 100, the subscriber is able to access network 110 through the gateway computer to take advantage of the electronic bill payment service. To register for the bill payment service, the subscriber visits a service registration home page on WWW at a predetermined uniform resource locator (URL), the address for the home page. This home page is preprogrammed on server computer 160 to elicit necessary information from the subscriber to start the service subscription. Instructed by an operating program in server computer 160, the latter prompts the subscriber through an initialization process where the subscriber is required to enter (a) the names of selected payees to which payments will be made electronically, (b) personal information including the name, address, telephone number, and social security number of the subscriber which enables the payees to sufficiently identify the subscriber, (c) the e-mail address of the subscriber, (d) the desirable service starting date, and (e) information about the subscriber's credit and checking accounts. Such information includes the identity of the bank(s) with which the subscriber has the accounts, and the account numbers. The service starting date must be at least a predetermined period from the present to allow EBSC to arrange with the selected payees to make the transition to sending the bill information to bill capture device 150. The registration home page also affords the subscriber a service demonstration whereby the subscriber is familiarized with the electronic bill payment service features.

After the initialization process, a second URL of a particular EBSC web site for bill payment is transmitted to the subscriber via either e-mail or regular mail. The subscriber also receives a userID and password. The userID is for identifying the subscriber when he or she subsequently logs on the server computer to utilize the electronic bill payment service, and the password is for safeguarding against unauthorized access to the subscriber's bills containing personal information, and against unauthorized payment of such bills.

On the service starting date and thereafter, as soon as the bill information concerning the subscriber is received, bill capture device 150 processes the information and transmits billing data to server computer 160 for access by the subscriber. Server computer tracks the due date of each bill of the subscriber. In the event that the subscriber does not log on the service and a bill is due within a predetermined period of time, server computer 160 will send e-mail or regular mail to bring the bill to the subscriber's attention.

An electronic bill payment program run in server computer 160 will now be described. This program is invoked when a subscriber visits the EBSC's bill payment web site. Instructed by the electronic bill payment program, server computer 160 prompts the subscriber for a userID for his/her identification, and a password to verify his/her access authorization, as indicated at step 305 in FIG. 2A. At step 310, when a userID and password are entered, the entries are verified by server computer 160. If either entry is not verified, the program prompts for the entries again in case that they were mistyped or partially forgotten. The subscriber is allowed to have a maximum of three attempts to enter the correct userID and password before the program terminates.

Figure 2B:
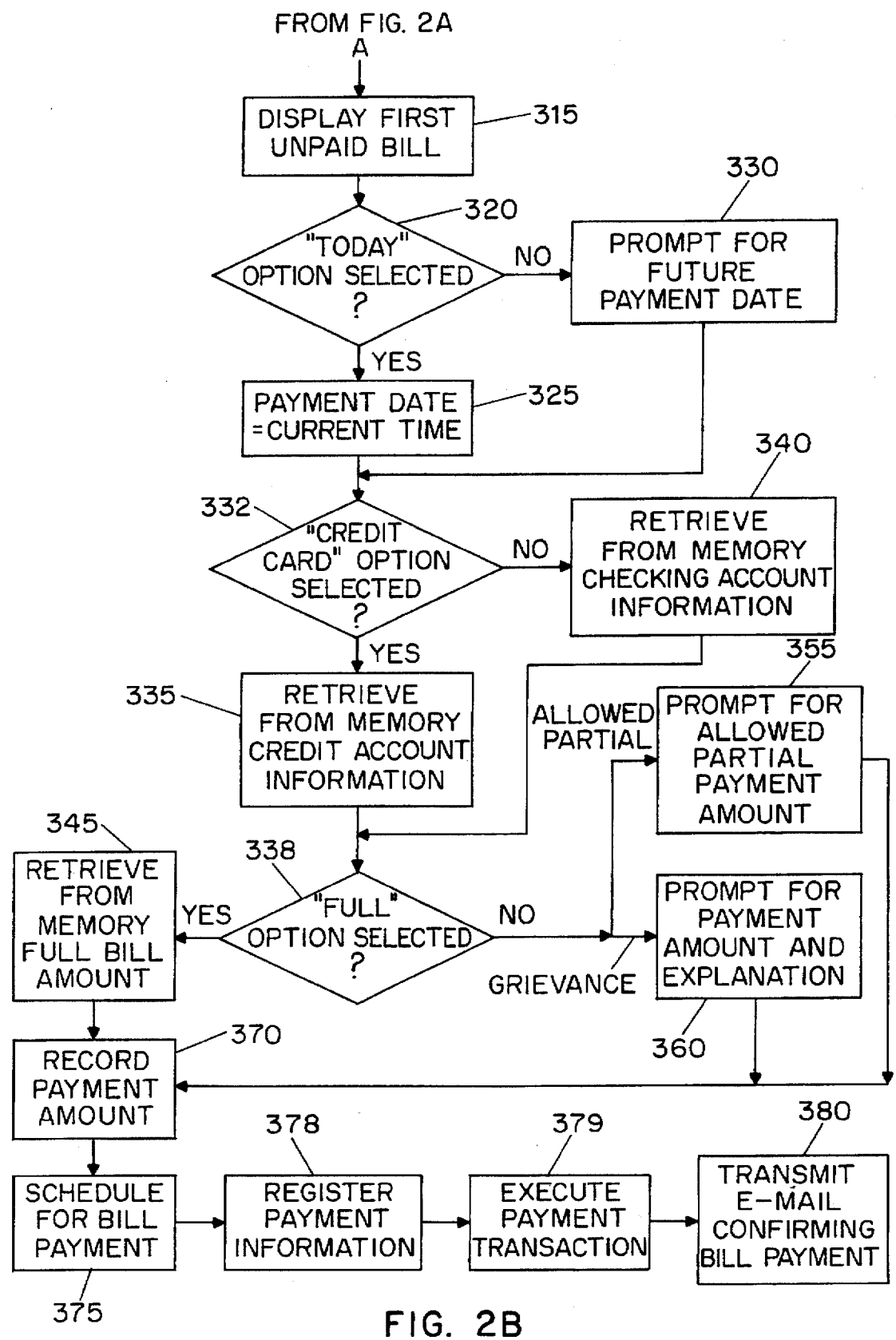
Figure 3:
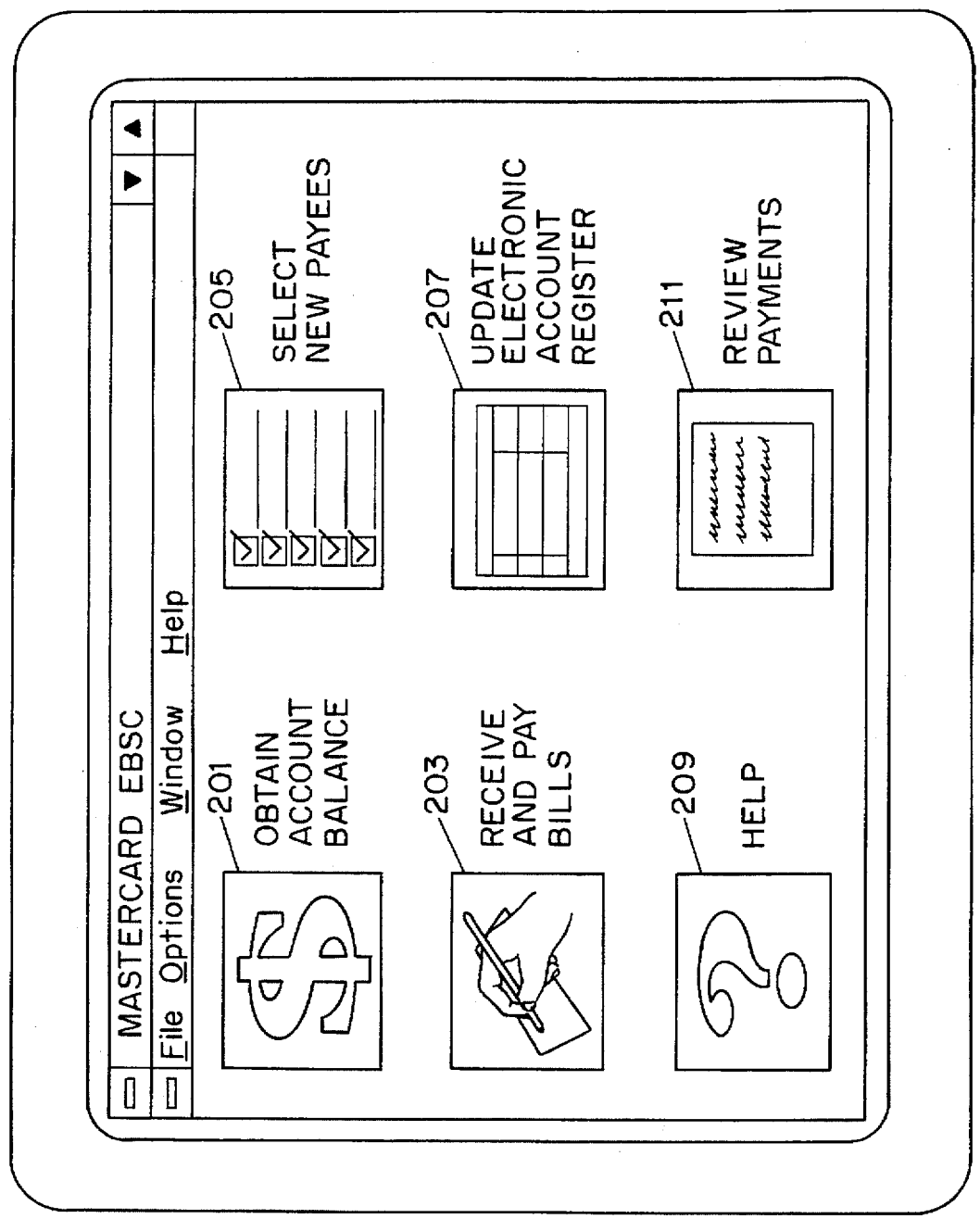
FIG. 3 is a representation of a home page on the World Wide Web (WWW) of the Internet accessible by users in the first embodiment of the system of FIGS. 1 and 5.
Figure 4:
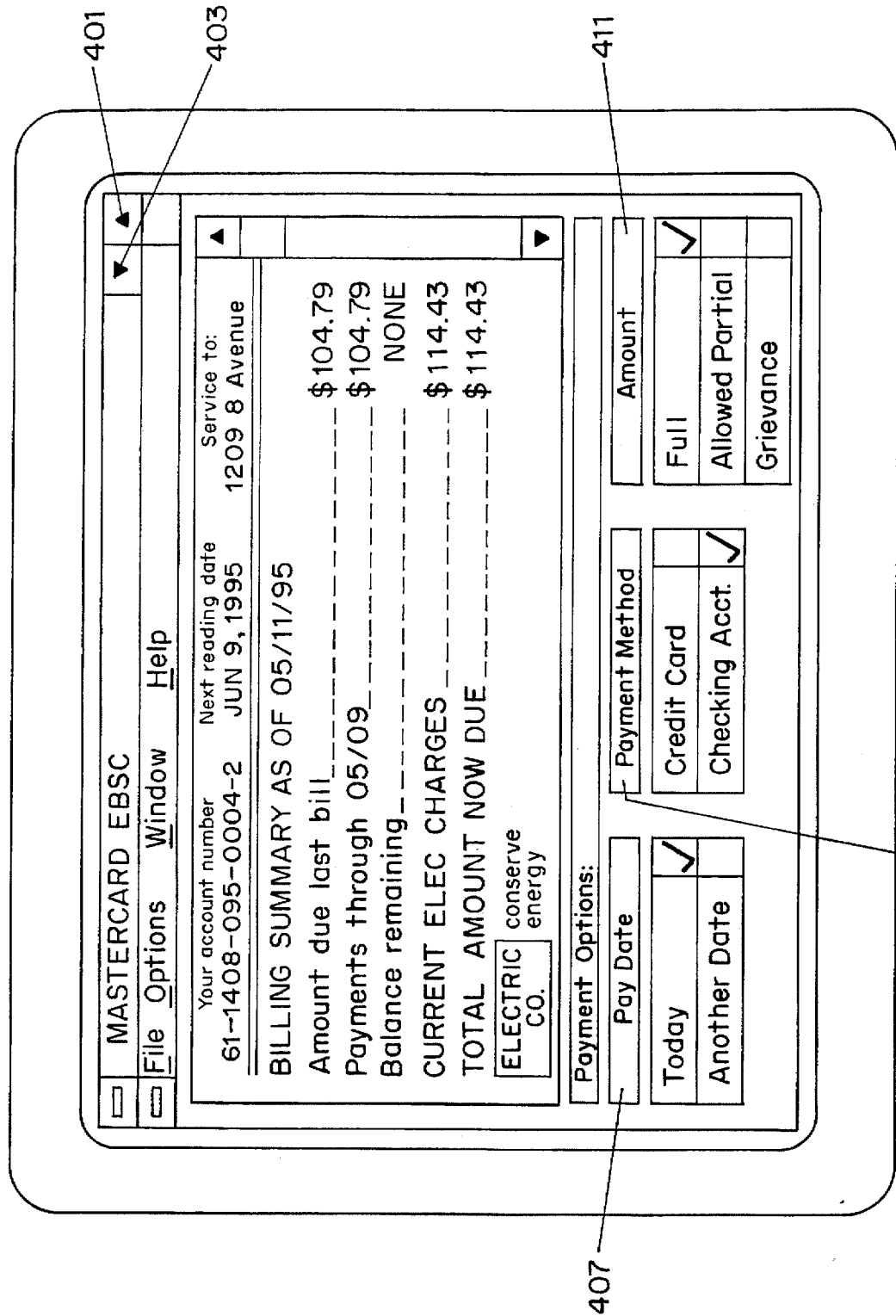
FIG. 4 is a display of a bill to be paid by a user in the first embodiment of the system of FIGS. 1 and 5.

After the correct userID and password have been entered and verified, the program at step 312 invokes a home page illustrated in FIG. 3. As shown in FIG. 3, the home page presents six choices in textual and graphical form. These choices are illustratively "Obtain Account Balance" 201, "Receive and Pay Bills" 203, "Select New Payees" 205, "Update Electronic Account Register" 207, "Help" 209 and "Review Payments" 211. Any of such choices is selected by operating on mouse 113 (or its keystroke equivalent or a trackball or any other similar indicator) connected to PC 100 to point at and click on the desired choice. At step 314, the program monitors whether one of the six choices on the home page is selected. If "Receive and Pay Bills" choice 203 is selected, the program proceeds to step 315 in FIG. 2B where server computer 160 causes display 107 to pull up an image of a first unpaid bill. The first bill, as displayed, is shown in FIG. 4 and illustratively an electric bill from Electric Co. In this preferred embodiment, all the unpaid bills are arranged in chronological order with the bill having the earliest due date displayed first. A subscriber may review other bills by clicking on up-arrow indicator 401 or down-arrow indicator 403 to retrieve the earlier or later bills.

Figure 2A:
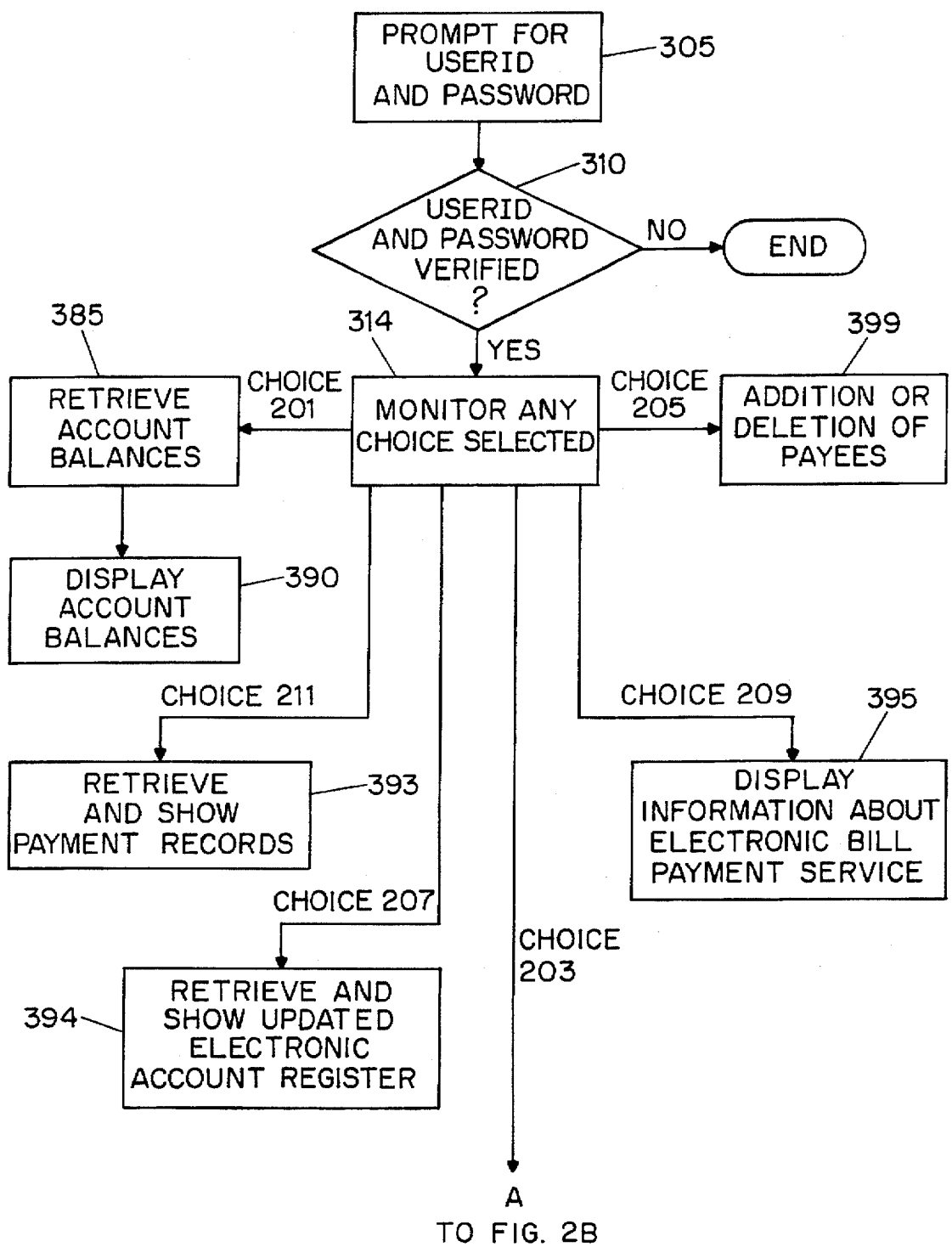
FIGS. 2A and 2B combinedly show a flow chart depicting the steps of an electronic bill payment program run on a server computer in a first embodiment of the system of FIGS. 1 and 5.

As shown in FIG. 4, options regarding payment of the electric bill are presented in three columns, namely, "Pay Date" 407, "Payment Method" 409 and "Amount" 411. The payment is deemed to have been authorized by the subscriber only when an option in each of the three columns is selected. Referring to FIGS. 2A and 2B along with FIG. 4, at step 320, server computer 160 monitors whether a "Today" option in "Pay Date" column 407 is selected. If such an option is selected, as in this example, server computer 160 records the current date as the date of payment, as indicated at step 325. Otherwise if the "Another Date" option is selected, server computer 160 prompts the subscriber to enter a future date as the payment date, as indicated at step 330.

At step 332, computer 160 determines whether a "Credit Card" option in "Payment Method" column 409 is selected to be the method of payment. If such an option is selected, as in this example, computer 160 retrieves from its memory the subscriber's credit account information, as indicated at step 335. Otherwise if the "Checking Account" option is selected as the payment method, server computer 160 retrieves from its memory the subscriber's checking account information, as indicated at step 340.

At step 338, computer 160 determines whether a "Full" option in "Amount" column 410 is selected. If such an option is selected, as in this example, server computer 160 retrieves from its memory the full bill amount as the payment amount, as indicated at step 345. Otherwise if an "Allowed Partial" option is selected, assuming that the billing account is a recurring or installment account where the subscriber is authorized by the payee to make partial payments, server computer 160 prompts for the allowed partial payment amount, as indicated at step 355.

In accordance with another aspect of the invention, the electronic bill payment service may provide for a grievance process whereby the subscriber may put the entire or a partial bill amount in dispute. To that end, the subscriber may select the "Grievance" option. In response, server computer 160 prompts at step 360 for a payment amount, for which the subscriber may enter any value from zero up to the full bill amount, exclusive. The subscriber is also prompted for an explanation for the deficiency which would be conveyed by EBSC to the appropriate payee. In any event, the payment entered by the subscriber is recorded by server computer 160 at step 370.

With the payment date, payment method and payment amount information, server computer 160 schedules the bill for payment, as indicated at step 375. At the same time, server computer 160 registers in a memory space allocated to the subscriber information about each payment including the scheduled payment date, the identity of the payee, and the payment amount, as indicated at step 378. The registered information is for the subscriber's records and may be reviewed by the subscriber's selecting "Review Payments" choice 211. Because the memory space allocated to the subscriber is limited, only payment information registered within a predetermined period of time is retained.

When the payment transaction is executed on the scheduled payment date as indicated at step 379, server computer 160 transmits an e-mail message to the subscriber confirming the bill payment, as indicated at step 380.

Returning to step 314, if "Obtain Account Balance" choice 201 is selected, based on the account information previously provided by the subscriber, server computer 160 retrieves at step 385 the available checking and credit account balances from the identified subscriber bank(s) via a connection to be described. At step 390, server computer causes display 107 to show the account balances. The balance information is important as the subscriber may check the information before he/she decides to pay bills using the credit or checking account, thereby avoiding a declined credit or debit transaction or an overdraft of the checking account.

At step 314, if "Update Electronic Account Register" choice 207 is selected, server computer 160 retrieves confirmed payment data and causes an update, taking into account the confirmed payments, to an electronic account register provided by the subscriber's financial management software of the type of QUICKEN, MICROSOFT MONEY or MANAGING YOUR MONEY preloaded on PC 100. Server computer 60 also causes the software to show the updated register on display 107, as indicated at step 394.

If "Review Payments" choice 211 is selected at step 314, server computer 160 retrieves the confirmed payment data, and the payment records created at step 378 described above, and causes display 107 to show records of payment with indications of "confirmed" status for those payments which were confirmed, as indicated at step 393.

If "Help" choice 209 is selected at step 314, server computer 160 causes display 107 to present a description of the electronic bill payment service including current service functions, rules and procedures, etc., as indicated at step 395.

If "Select New Payees" choice 205 is selected at step 314, server computer 160 causes display 107 to list all the payees previously identified by the subscriber, and enables the subscriber to add new payees to or delete selected payees from the list, as indicated at step 399. Upon learning the changes in the payee list, the personnel of the EBSC accordingly establishes or cancels the electronic bill payment service with the corresponding payees.

As mentioned above, the subscribers may pay the electronic bills by their credit accounts. However, to prevent fraud, security measures are built in to the operating program of server computer 160 such that use of a credit card account to pay credit card bills having the same credit card account number is thwarted by the software. In addition, since Internet network 110 is a packet-switched network wherein a message may be routed through many different nodes before reaching its destination, a risk of having a message containing the credit or checking account information intercepted on the Internet arises. Although such a message is transmitted only once during the service registration process, to eliminate such a risk, a well-known public key cryptographic algorithm, such as the RSA algorithm, may be utilized by the subscriber to encrypt communications to server computer 160. The latter may also use the same algorithm to encrypt the e-mail messages sent to the subscribers. Named after its developers—Rivest, Shamir, and Adleman—the RSA algorithm uses a private key and a public key to encrypt and decrypt messages. The keys are generated mathematically in part by combining prime numbers. For details on the RSA algorithm and its application, one may refer to U.S. Pat. No. 4,405,829 issued Sep. 20, 1983 to Rivest et al., which is hereby incorporated by reference.

Figure 5:
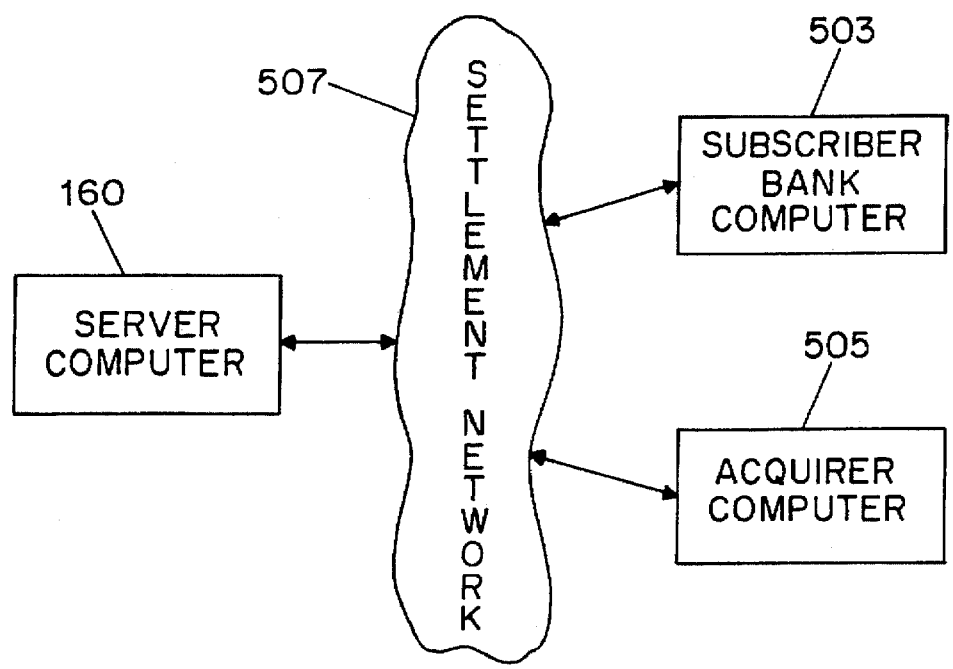

FIG. 5 illustrates a connection of server computer 160 to subscriber bank computer 503 and acquirer computer 505 through settlement network 507. The latter includes conventional ACH and MasterCard's Banknet. Subscriber bank computer 503 is controlled and maintained by a bank with which a subscriber has credit and/or checking accounts for paying bills. Acquirer computer 505 is controlled and maintained by an acquirer bank with which one or more of the payees have accounts.

Figure 6:
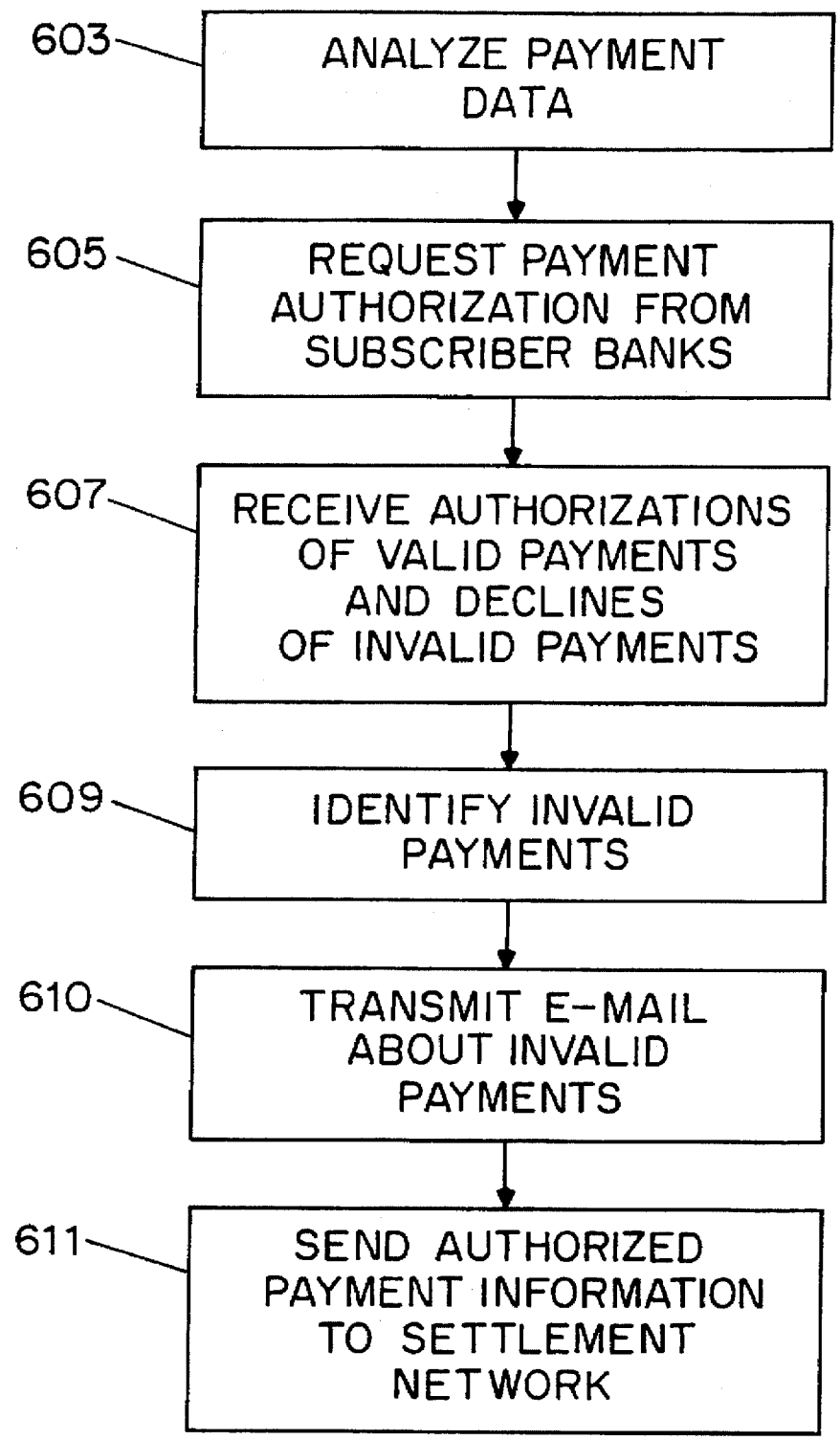
FIG. 6 is a flow chart depicting a process run by the server computer.

Referring now to FIG. 6, upon receiving bill payment data from subscribers through network 110, server computer 160 analyzes the payment data, as indicated at step 603. The analysis involves organizing the payments by the scheduled payment dates, accounting for those payments made on the credit and/or checking accounts, and separately accounting for those payments made to each payee. At the end of each day, server computer 160 transmits to each subscriber bank information about the individual payments of the day drawn on its accounts, and requests payment authorization from the subscriber bank through computer 503 for example, as indicated at step 605. In return, server computer 160 at step 607 receives from subscriber bank computer 503 authorizations of valid payments, plus credit or debit declines of invalid payments determined by the subscriber bank. The invalidity of payments may result from subscribers' overdrafts of checking accounts, fraudulent uses of stolen account numbers, overextensions of credit limits, etc. At step 609, server computer 160 identifies those subscribers responsible for the invalid payments. Server computer 160 then transmits e-mail messages about the invalid payments to the respective subscribers' electronic addresses, as indicated at step 610. At step 611, server computer 160 sends the authorized payment information to settlement network 507. In a conventional manner, the settlement network forwards the information and moves funds as appropriate between subscriber banks' computers (including computer 503) and acquirer banks' computers (including computer 505). Each acquirer bank then credits the received funds to the corresponding payees' accounts, less any transaction fees.

Figure 7:
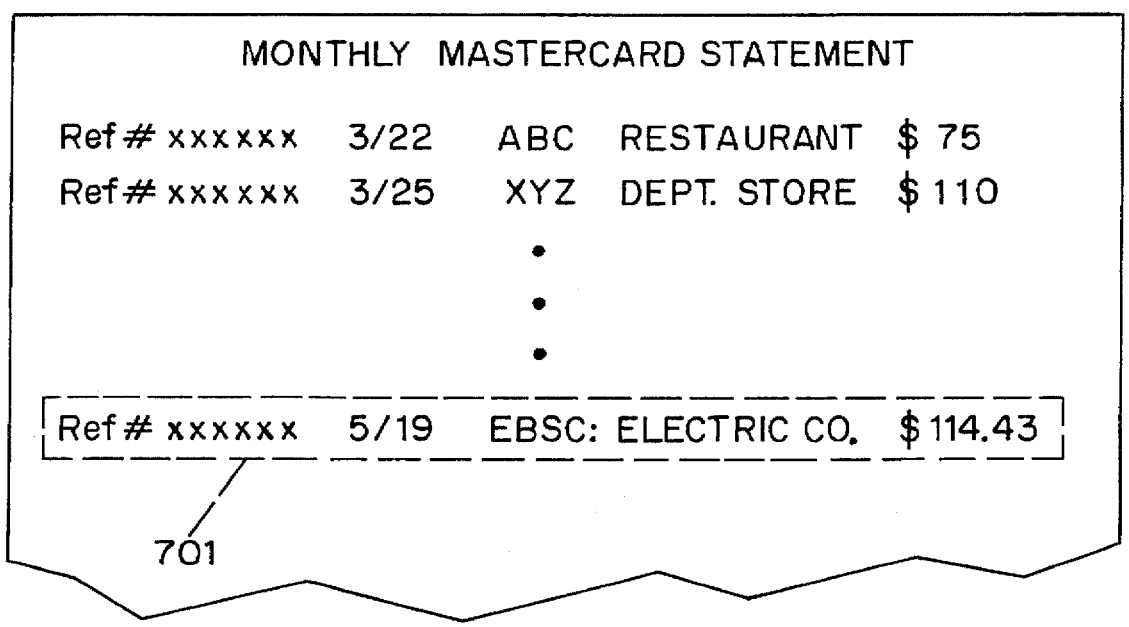
FIG. 7 is a credit card statement documenting a bill payment using the system of FIGS. 1 and 5.

FIG. 7 illustrates a typical subscriber's credit card statement wherein a payment to Electric Co., which was made on the subscriber's credit account, is numerically denoted 701.

A second embodiment of the invention will now be described. This second embodiment differs from the previous embodiment principally in that the electronic bill payment service in this embodiment is not provided using a home page on WWW to be accessed by subscribers. Rather, the inventive service is realized by e-mail communications over Internet network 110 between server computer 160 and the subscribers.

In this second embodiment, after receiving the billing data from bill capture device 150, server computer 160 formats the data in the form of e-mail messages, in accordance with the standard Internet specifications. These e-mail messages, hereinafter referred to as "electronic bills", contain the bill information. Like e-mail, the electronic bills are transmitted over network 110 to the respective subscribers at their e-mail addresses. Each electronic bill, however, has a message header containing an identification having a predetermined bit pattern for distinguishing the electronic bill from other e-mail. In addition, the message header also contains status bits reflecting the current statuses concerning the electronic bill. For example, one of these bits, termed the "open" bit, indicates whether the bill has ever been opened or read by the subscriber. The value of the open bit is initially set to 0, indicating that it has never been read. Another bit, termed the "pay" bit, indicates whether the bill has ever been authorized to be paid. The value of the pay bit is also set to 0 initially, indicating that it has never been authorized to be paid.

In this illustrative embodiment, the on-line software package installed on PC 100 includes an electronic bill payment program to be described. With the installed software package, the subscriber manages to access network 110 through the aforementioned gateway computer, and take advantage of the electronic bill payment service. To initiate the service, the gateway computer retrieves a copy of the electronic bill payment program from PC 100 and runs the program. When the subscriber enters the program the first time, it prompts the subscriber through an initialization process where certain information similar to that in the first embodiment is elicited. After the initialization process, all the information provided by the subscriber is formatted in an e-mail message. This message is then transmitted through network 110 to server computer 160 for service enrollment. Similar to the first embodiment, as part of the initialization process, the subscriber also receives by e-mail or regular mail a userID and password, a copy of which is stored at the gateway computer. The purpose of the userID and password is to identify the subscriber and safeguard against unauthorized access to the subscriber's electronic bills, which are saved in a depository in the gateway computer. Again, the initialization process can be repeatedly invoked to add or delete payees, and to change other information.

On the service starting date designated by the subscriber and thereafter, as soon as the billing data concerning the subscriber is received, server computer 160 formats the data in the form of electronic bills and forwards the bills to the subscriber's e-mail address through network 110. Advantageously, from network 110, the subscriber can receive and open the electronic bills like regular e-mail whenever and wherever he/she has a chance to get on-line with a PC (not necessarily PC 100) having a copy of the on-line software package including the electronic bill payment program.

Utilizing a standard receipt confirmation feature of the e-mail service, server computer 160 would receive an acknowledgement message through network 110 when the electronic bill is received and opened by the subscriber. This acknowledgement message includes a time stamp indicating the date and time when the electronic bill was opened, the subscriber's e-mail address indicating where the acknowledgement comes from, and the information in the "subject" field of the electronic bill, which identifies the bill by including the payee's name, bill amount and payment due date. In accordance with another aspect of the invention, the EBSC is alerted by computer 160 to those electronic bills whose acknowledgement messages have not been received before their respective due dates. The alert may take the form of a daily print-out of the outstanding bills from computer 160. Upon reading the print-out, in order to avoid overdue payments, the EBSC will attempt to inform the subscriber of his/her outstanding bills by other means of communications such as regular mail.

Figure 8A:
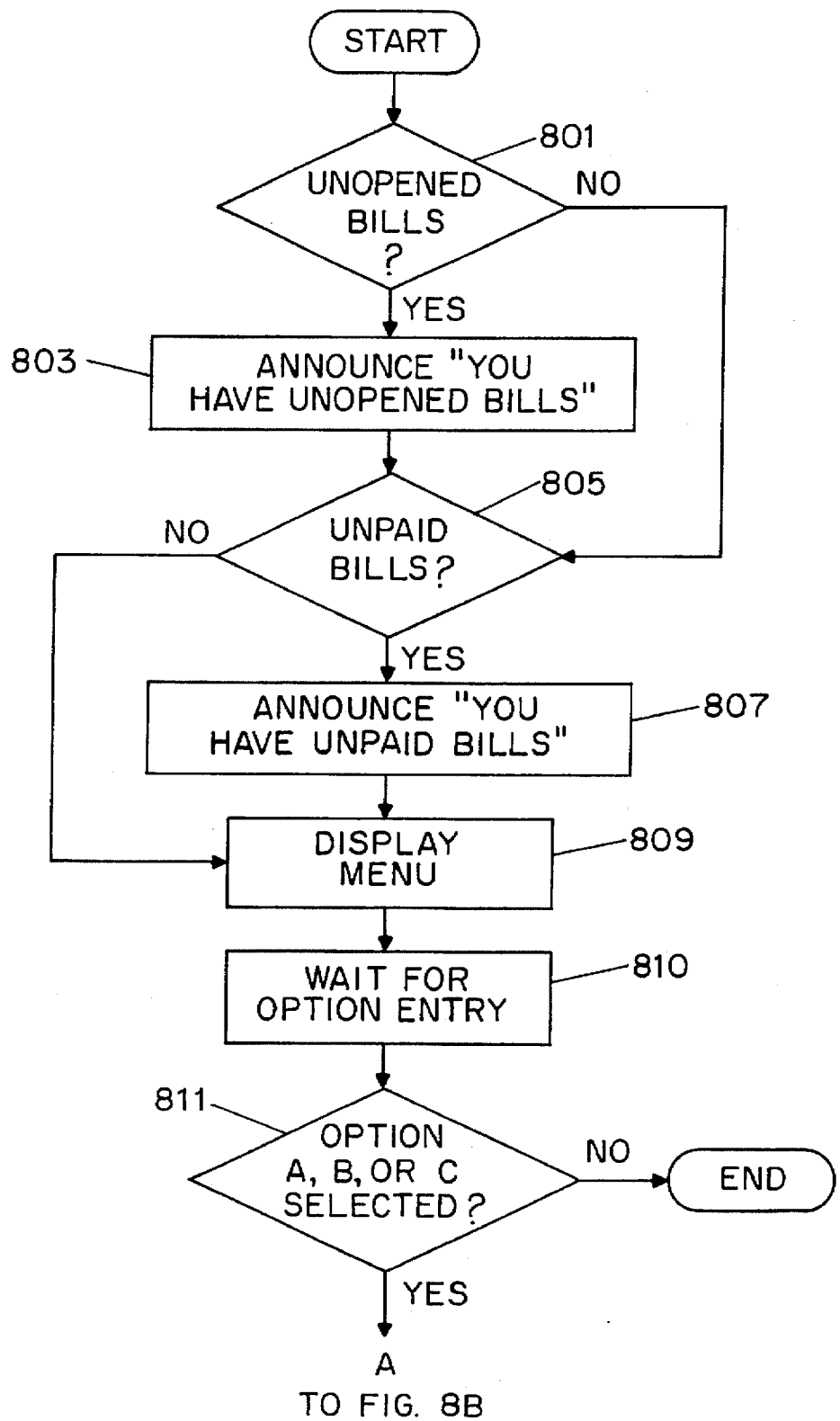
FIGS. 8A and 8B combinedly show a flow chart depicting the steps of a program for making electronic bill payments in a second embodiment of the system of FIGS. 1 and 5.
Figures 9, 10:
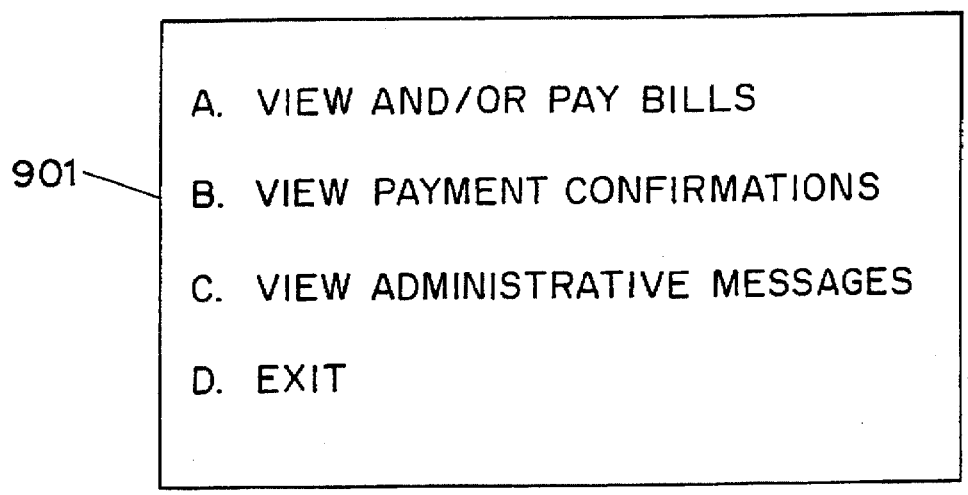
FIG. 9 is a menu of options provided by the program of FIGS. 8A and 8B.
FIG. 10 is a display presenting electronic bills in a summary format, which is triggered by the program of FIGS. 8A and 8B.

In operation, upon invocation the electronic bill payment program first checks for any electronic bills unopened by the subscriber, as indicated at step 801 in FIG. 8A. This is done by reading the open status bits of all the electronic bills saved including the newly arrived bills. If any unopened bill is detected, the program at step 803 causes display 107 to exhibit an announcement such as "YOU HAVE UNOPENED BILLS!" to alert the subscriber to read the bills. In either event, the program proceeds to step 805 where the pay status bits of all the previously opened bills are checked to see whether they have been paid. If unpaid bills are detected, the program at step 807 causes display 107 to exhibit another announcement such as "YOU HAVE UNPAID BILLS!" to alert the subscribers that not all the opened bills have been paid. In either event, the program proceeds to step 809 where it causes display 107 to exhibit menu 901 as shown in FIG. 9.

Menu 901 offers four options from which the subscriber may select. These options include option A which allows the subscriber to view and/or pay bills, option B which allows the subscriber to view confirmations of bill payments, option C which allows the subscriber to view administrative messages from server computer 160, and option D which allows the subscriber to exit the electronic bill payment program. The options are selected by pressing the corresponding letter on keyboard 109, followed by the "Enter" key.

Referring briefly back to FIG. 8A, the electronic bill payment program at step 810 waits for an option entry by the subscriber. If selection of an option other than option D is detected at step 811, the program then prompts for a userID and password to verify the subscriber's access authorization, as indicated at step 813 in FIG. 8B. Otherwise, the program comes to an end.

At step 813, when a userID and password are entered on PC 100, the entries are checked against the userID and password previously stored. Again, the subscriber is allowed to have a maximum of three attempts to enter the correct userID and password before the program terminates.

After the correct userID and password have been entered and verified, if option A has been selected, the program proceeds to step 817 where it causes display 107 to list all the unopened bills together with the unpaid bills. This list is illustratively shown in FIG. 10. Each bill is exhibited in a summarized form based on the information of its "subject" field indicating the payee's name, bill amount and due date.

In this example, the subscriber has three unopened and/or unpaid bills which are arranged in chronological order with the bill having the earliest due date listed first. Bills previously unopened are indicated by asterisks. In this instance, bill no. 3 is marked with an asterisk as it has never been opened by the subscriber.

A highlighting capability is provided to facilitate the opening of a particular bill as listed. The subscriber may open the electronic bill currently highlighted by highlighter 1003 (bill no. 2 in this instance) by pressing the "Enter" key on keyboard 109. Highlighter 1003 may be moved by pressing directional (up-arrow and down-arrow) keys to highlight a different listed bill. It will, however, be appreciated that a person skilled in the art may use, instead of the highlighting capability just described, an indicator movable by mouse 113 (or a track ball, or any other similar device) to point at a desirable, listed bill on the screen, and click open the bill.

Once the subscriber chooses to open a bill which has never been opened, its open status bit value is changed from "0" to "1" to reflect the new "opened" status. In addition, an acknowledgement message as previously described is sent to server computer 160 through network 110 after the bill is opened the first time.

Figure 8B:
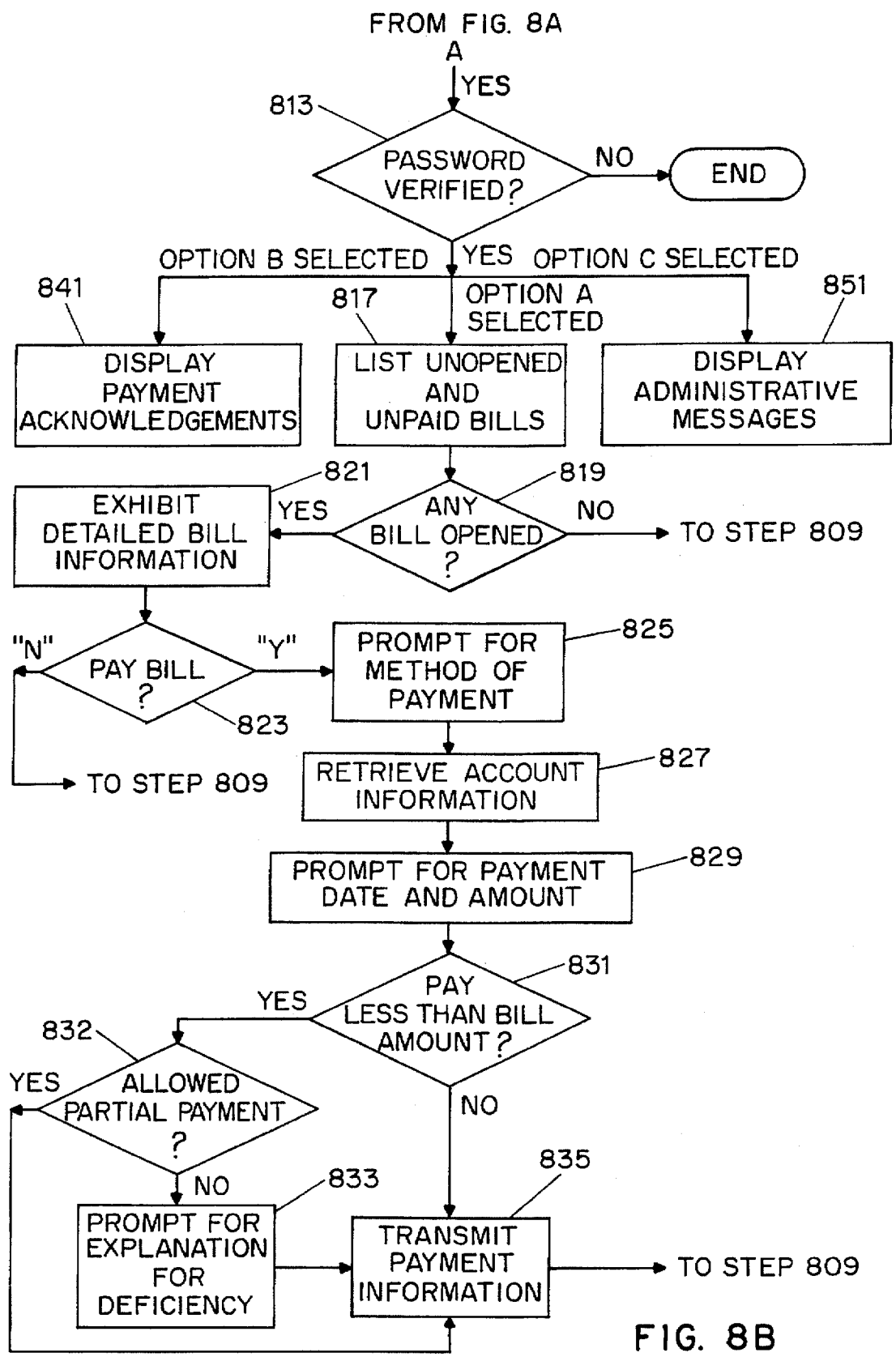

Referring to FIGS. 8B and 11, if it is detected that a bill from the list is selectively opened at step 819, the program at step 821 causes display 107 to exhibit the electronic bill, which is illustratively shown in FIG. 11. The electronic bill, as illustrated, includes EBSC's e-mail address 1101, subscriber's e-mail address 1103, subject field 1105, and service account number 1109 and other bill information similar to that of FIG. 4. It should be pointed out that subject field 1105 contains the concise information on the payee's name, bill amount and due date as mentioned above. If the program detects any other action by the subscriber on keyboard 109 than opening an electronic bill at step 819, the program returns to step 809.

At step 823 following step 821, the subscriber is queried whether he/she wants to authorize the payment of the bill. If the subscriber presses "N" on keyboard 109, indicating a negative response, the program again returns to step 809, and the pay status bit value remains to be "0" as the bill remains unpaid. Otherwise if the subscriber presses "Y", indicating an affirmative response, the program prompts for the preferred method of payment, as indicated at step 825.

Similar to the first embodiment, the subscriber is allowed to pay the bill by using either checking or credit account. After the preferred method of payment is indicated, computer 160 retrieves from its memory the corresponding account information, as indicated at step 827. The program then proceeds to step 829 where the subscriber is prompted for the payment date and payment amount. Since the subscriber would most likely set the payment date to be the due date, and the payment amount to be the bill amount, the due date and the bill amount are conveniently set to be the default values.

The electronic bill payment service in this embodiment also provides for a grievance process whereby the subscriber may put the entire or a partial bill amount in dispute. To that end, the subscriber may enter for the payment amount, instead of the default value, any value from zero up to the bill amount, exclusive. Thus, if at step 831 the program detects that the payment amount entered is less than the default value, the program queries whether the partial payment is permitted by the payee, as indicated at step 832. If the response is negative, the subscriber is prompted for an explanation for the deficiency, as indicated at step 833. As mentioned before, the subscriber's explanation would be conveyed by EBSC to the appropriate payees. In any event, the payment is transmitted to server computer 160 in the form of reply e-mail through network 110, as indicated at step 835. The pay status bit value of the electronic bill just paid is accordingly changed from "0" to "1" to reflect the new "paid" status of the bill. The program then returns to step 809.

Server computer 160 opens the payment response as soon as it is received from network 110. Using the aforementioned receipt confirmation feature of e-mail, when the payment response in the form of reply e-mail is opened by server computer 160, an acknowledgement message confirming the receipt of the response is returned to the subscriber. The acknowledgement message indicates the date and time when the payment response was opened, and the payee's name, payment amount and due date, as appeared in the subject field of the reply e-mail.

Thus, at step 811, if option B of FIG. 9 is selected, the electronic bill payment program causes display 107 to list the acknowledgement messages concerning payments previously sent, as indicated at step 841. These acknowledgement messages serve as confirmations of the payments.

For the sake of completeness, if option C of FIG. 9 is selected at step 811, the electronic bill payment program proceeds to step 851 where it causes display 107 to exhibit administrative messages including personal messages from EBSC, which were sent by server computer 160 to the subscriber in the form of e-mail.

For public information, EBSC provides an anonymous file transfer protocol (FTP) site within server computer 160, where a description of the present electronic bill payment service including current service functions, rules and procedures, etc., is available to the service subscribers, and the Internet users in general.

Upon receiving bill payment responses in the form of e-mail from network 110, server computer 160 analyzes the response data and settles the bill payments in a similar manner described above. However, for invalid payments, server computer 160 retransmits the corresponding electronic bills to the respective subscribers' e-mail addresses. The format of the retransmitted electronic bills is similar to the original bills, except that it is additionally indicated in the "subject" of the retransmitted bills that these are "REPOSTED" bills. These retransmitted bills, when received at the subscribers' e-mail addresses, are treated like newly arrived electronic bills. Nonetheless, when the subscribers list the outstanding bills on the screen, the word "REPOSTED" will appear in the summaries of the retransmitted bills to alert the subscribers. When the subscribers open the retransmitted bills, explanations for the invalid payments will appear at the beginning of the bills.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, it will be appreciated that network 110 may not necessarily be the Internet, but may be a telephone network, a private network or other communications network through which subscribers are able to communicate with server computer 160.

I claim:

1. A system for delivering and paying subscriber bills associated with a plurality of payees over a communications network comprising:

a server computer connected to the network;

at least one subscriber computer connected to the network; and a bill capture device coupled to the server computer, the bill capture device adapted to accept bill information from a plurality of payee computers each associated with one or more of the plurality of payees, to format the bill information into bill images and to forward the bill images to the server computer, the server computer including a memory for storing subscriber payment data and adapted to transmit the bill images over the network to the at least one subscriber computer, each subscriber computer including a processor, communication means for receiving the bill images, a server access program for viewing the bill images, a display for displaying the bill images and input means for selecting at least one bill payment option, wherein the processor, responsive to the input means, causes the communication means to transmit a bill payment record to the server computer which, in response, forwards the bill payment record to the bill capture device which routes the bill payment signal to a corresponding one or more of the payee computers.

2. The system of claim 1 wherein the subscriber payment data comprises subscriber payment method data, payee data, payee payment date data and payee payment amount data.

3. The system of claim 1 wherein the bill payment record comprises payee payment date data, payee payment method preference data and payee payment amount data.

4. The system of claim 3 wherein the bill payment record further comprises grievance data.

5. The system of claim 1 wherein the network is an Interact network.

6. The system of claim 1 wherein the network is the World Wide Web and the server access program is a web browser for browsing the bill image.

7. The system of claim 1 wherein the bill capture device comprises a computer.

8. The system of claim 1 wherein the bill capture device comprises a computer program.

9. The system of claim 1 wherein the bill images include a homepage of the server computer.

10. The system of claim 9 wherein the homepage includes means for checking an amount of available funds for payments.

11. The system of claim 9 wherein the homepage includes means for reviewing payment records.

12. The system of claim 1 wherein the bill images are transmitted in the form of e-mail.

13. The system of claim 1 wherein the server is further adapted to transmit messages to the at least one subscriber computer confirming bill payments over the communications network.

14. A method of delivering and paying bills over a communications network to which are coupled a server computer and at least one subscriber computer, the server computer comprising a memory for storing subscriber payment data and the at least one subscriber computer comprising a communications means, a server access program, a display and an input means, the method comprising the steps of:

accepting at a bill capture device bill information from a plurality of payee computers;

formatting the bill information into bill images;

forwarding the bill images to the server computer;

transmitting the bib images over the communications network to at least one of the subscriber computer via the communication means;

displaying the bill images on the display with the server access program;

selecting with the input means a bill for payment and payment particulars;

transmitting to the server computer, responsive to the input means, a bill payment record with the communication means;

forwarding the bill payment record to the bill capture device; and routing the bill payment record to a corresponding payee computer.

15. The method of claim 14 wherein the selecting step comprises the steps of selecting a payee, a payment date, a payment method and a payment amount and wherein the method further comprising the steps of:

retrieving from the memory of the server computer data representative of the subscriber account corresponding to the selected payment method; and storing data representative of the selected payee, the selected payment date, the selected payment method and the selected payment amount in the memory of the server computer.

16. The method of claim 15 further comprising the step of providing to a subscriber an option to review bill payment information located in the memory.

17. The method of claim 14 further comprising the step of transmitting a confirmation message from the server computer to the subscriber computer confirming that a bill has been paid.

18. The method of claim 17 wherein the confirmation transmitting step comprises the step of transmitting the confirmation message by e-mail.

19. The method of claim 14 wherein the routing step comprises the steps of:

routing the bill payment record over a settlement network to a payee computer; and settling the bill payment over the settlement network with an acquirer computer.

20. The method of claim 19 wherein the settling step comprises the step of the payee computer billing a subscriber on a credit card statement for the bill payment amount.

21. A system for presenting subscriber bill information associated with plurality of payees over a network comprising:

at least one subscriber computer connected to the network;

a plurality of payee computers each associated with one or more of the plurality of payees;

a server computer connected to the network for providing the bill information received from the at least one payee computer to the at least one subscriber computer; and a bill capture device coupled to the server computer, the bill capture device adapted to accept the bill information from the at least one payee computer to format the bill information into bill images and to forward the bill images to the server computer;

wherein each subscriber computer includes a display for displaying the bill images.

22. The system of claim 21 wherein each bill image comprises a payee payment date option field, a payee payment method option field and a payee payment amount option field.

23. The system of claim 22 wherein each bill image further comprises a grievance option field.

24. The system of claim 21 wherein the network is an Internet network.

25. The system of claim 21 wherein the network is the World Wide Web and each subscriber computer includes a web browser for browsing the bill image.

26. The system of claim 21 wherein the bill capture device comprises a computer.

27. The system of claim 21 wherein the bill capture device comprises a computer program.

28. The system of claim 21 wherein the bill images reside on a homepage of the server computer.

29. The system of claim 28 wherein the homepage includes means for checking an amount of available funds for payments.

30. The system of claim 28 wherein the homepage includes means for reviewing payment records.

31. The system of claim 21 wherein the bill images are transmitted in the form of e-mail.

32. A method of presenting and paying bills over a communications network to which are coupled a server computer and at least one subscriber computer, the server computer comprising a memory for storing subscriber payment data and the at least one subscriber computer comprising a communications means, a server access program, a display, the method comprising the steps of:

accepting at a bill capture device bill information from a plurality of payee computers;

formatting the bill information into bill images;

transmitting the bill images over the communications network to at least one of the subscriber computer via the communication means;

displaying the bill images on the display with the server access program;

accepting bill payment information from one at least one of the subscriber computer; and routing the bill payment record to at least one corresponding payee computer.

33. The method of claim 32 wherein the accepting step comprises the steps of accepting a payee, a payment date, a payment method and a payment amount and wherein the method further comprising the steps of:

retrieving from the memory of the server computer data representative of the subscriber account corresponding to the selected payment method; and storing data representative of the selected payee, the selected payment date, the selected payment method and the selected payment amount in the memory of the server computer.

34. The method of claim 32 further comprising the step of providing to a subscriber an option to review bill payment information located in the memory.

35. The method of claim 32 further comprising the step of transmitting a confirmation message from the server computer to the subscriber computer confirming that a bill has been paid.

36. The method of claim 35 wherein the confirmation transmitting step comprises the step of transmitting the confirmation message by e-mail.

37. The method of claim 32 wherein the routing step comprises the steps of:

routing the bill payment record over a settlement network to a payee computer; and settling the bill payment over the settlement network with an acquirer computer.

38. The method of claim 37 wherein the settling step comprises the step of the payee computer billing a subscriber on a credit card statement for the bill payment amount.

* * * * *

UNITED STATES PATENT AND TRADEMARK OFFICE
CERTIFICATE OF CORRECTION

PATENT NO. : 5,699,528
DATED : December 16, 1997
INVENTOR(S) : Edward J. Hogan

It is certified that error appears in the above-indentified patent and that said Letters Patent is hereby corrected as shown below:

Column 7, line 45, "60" should read -- 160--.

Column 13, line 61, "bib" should read -- bill --.

Column 15, line 30, delete the first occurrence of "one".

Signed and Sealed this

First Day of June, 1999

Attest:

Q. TODD DICKINSON

Attesting Officer

Acting Commissioner of Patents and Trademarks